United States Patent [19]
Wienand et al.

[11] Patent Number: 6,079,265
[45] Date of Patent: Jun. 27, 2000

[54] METHOD FOR ATTACHING AND INSULATING RESISTORS

[75] Inventors: Karlheinz Wienand, Aschaffenburg; Stefan Dietmann, Haiterbach; Christian Koch, Kleinostheim; Karl-Heinrich Lösing, Alpen; Peter Witkowski, Jüchen, all of Germany

[73] Assignees: Heraeus Electro-Nite International N.V., Houthalen, Belgium; Pierburg GmbH, Neuss, Germany

[21] Appl. No.: 08/968,868

[22] Filed: Nov. 5, 1997

Related U.S. Application Data

[63] Continuation of application No. 08/697,590, filed as application No. PCT/EP95/00659, Feb. 23, 1995.

[30] Foreign Application Priority Data

Feb. 28, 1994 [DE] Germany .............................. 44 06 331

[51] Int. Cl.⁷ .............................. G01F 1/68; H01R 23/70
[52] U.S. Cl. .......................... 73/204.26; 73/756; 439/630
[58] Field of Search .......................... 73/204.22, 204.26, 73/756; 439/59, 79, 630, 632, 629

[56] References Cited

U.S. PATENT DOCUMENTS

| | | | |
|---|---|---|---|
| 4,314,970 | 2/1982 | Stein et al. | 422/72 |
| 4,320,655 | 3/1982 | Kammermaier et al. | 73/204.26 |
| 4,330,077 | 5/1982 | Young | 228/139 |
| 4,563,402 | 1/1986 | Kobayashi et al. | 429/178 |
| 4,798,178 | 1/1989 | Greulich et al. | 123/90.6 |
| 4,886,342 | 12/1989 | Kudo et al. | 350/252 |
| 4,894,111 | 1/1990 | Krause et al. | 156/294 |
| 5,188,534 | 2/1993 | Bertho et al. | 439/79 |
| 5,207,765 | 5/1993 | Eiermann et al. | 73/204.26 |
| 5,307,677 | 5/1994 | Beyrich et al. | 73/204.26 |
| 5,540,100 | 7/1996 | Von Berg | 73/756 |

FOREIGN PATENT DOCUMENTS

| | | |
|---|---|---|
| 522 386 | 1/1993 | European Pat. Off. . |
| 3040448 | 5/1982 | Germany . |
| 31 27 097 | 1/1983 | Germany . |
| 90 11 927 | 12/1990 | Germany . |
| 41 22 295 | 1/1993 | Germany . |
| 42 07 676 | 9/1993 | Germany . |
| 2 201 000 | 8/1988 | United Kingdom . |

Primary Examiner—Harshad Patel
Attorney, Agent, or Firm—Frishauf, Holtz, Goodman, Langer & Chick, P.C.

[57] ABSTRACT

A sensor arrangement for a film type anemometer which includes a carrier plate; a precision resistor; a planar, elongated heating resistor supplied with an adjustable power supply; and a retaining device. The operational temperature of the heating resistor is increased by a fixed predetermined differential amount versus the temperature determined by the precision resistor. The heating resistor has at least one resistive layer disposed on a substrate. The heating resistor is attached in a bridge-like fashion in a recess of the carrier plate. The retaining device has a low heat transfer and has two opposite attachment areas which retain respective ends of the heating resistor. Each of the attachment areas being directed towards respective ends of the heating resistor and each attachment area having at least a bearing surface, a lateral peripheral surface and a longitudinal peripheral surface which extends in the longitudinal direction of the heating resistor for receiving an end area of the heating resistor. At least one of the surfaces of the attachment areas is fastened in a mechanically stable fashion to an edge area of the heating resistor. The heating resistor is partially covered at least at one of its ends and on a top surface portion thereof in the attachment areas by a surface portion of the carrier plate.

9 Claims, 6 Drawing Sheets

METHOD FOR ATTACHING AND INSULATING RESISTORS

This application is a Continuation, of application Ser. No. 08/697,590, filed Aug. 27, 1996, which is a Continuation of International Application No. PCT/EP95/00659, filed Feb. 23, 1995.

BACKGROUND OF THE INVENTION

1. Field of the Invention

The present invention pertains to a sensor arrangement for an anemometer using a film type precision resistor and a planar, elongated film type heating resistor supplied with an adjustable power supply. The present invention also concerns a method for attaching a resistor to a carrier.

2. Background Information

EP 0 522 386 A1 describes an air mass flow meter comprising a film type anemometer with a Venturi tube, which is held in a tubular housing by ribs extending in a radial direction. One of the ribs is hollow and, in a rib recess formed in this fashion, a frame support with two resistors in the form of semiconductor chips projects into the Venturi tube channel. The resistors are held in a bridge-forming position by retaining studs.

In EP 0 522 386 A1, the heat insulation between the resistors and the frame support can be problematic, so that the accuracy when determining the air mass flow can be impaired due to heat transfer from the resistor to the retaining device.

GB-A-22 01 000 discloses a retaining device for a rectangular, plate-shaped, thin-film resistor for an air mass flow meter, which is held by means of elastic steel strips and which is said to have improved heat insulation. The device of GB-A-22 01 000 contains two opposite parallelepiped-shaped retaining elements made of a heat-insulating material and having obliquely extending, V-shaped grooves for engaging the corners of a resistor. The device of GB-A-22 01 000 is a relatively elaborate construction.

DE-PS 31 27 097 discloses a device for retaining plate-shaped, electrical thin-layer resistors consisting of a thin metal layer made from an electrically insulating carrier. The heatable thin-layer resistor bears upon at least three pointed supports of a retaining clamp and is pressed against the supports by at least two brackets of a retaining clamp which are provided with points. DE-PS 31 27 097 aims to meet the objective of providing a device for retaining plate-shaped, electrical thin-layer resistors consisting of a thin metal layer on an electrically insulating carrier, in particular for use in for an anemometer of the film type for measuring flow. The goals of the device of DE-PS 31 27 097 are to provide an accurate and secure positioning in all three dimensions, to ensure an extremely rapid adjustment of the thermal balance and be only negligibly affected by the amount of heat carried-off by the fluid flow of heated thin-layer resistors.

The relatively elaborate construction of DE-PS 31 27 097, according to which the thin-layer resistor is attached at its four corners to four points of a support by means of brackets, so that additional tongues are required for fastening purposes and contact, is problematic.

U.S. Pat. No. 4,320,655 describes a mass flow meter based on a heat-resistance anemometer, whereby not only a heating resistor, but also a comparator resistor, are attached to an electrically insulating carrier using the thin-layer technique. The comparator resistor is applied in a meandering or wavy form.

In U.S. Pat. No. 4,320,655, the relatively large heat capacity of the carrier and the resistor attached thereto, which results in the response properties being relatively slow vis-a-vis fast flow changes, likewise proves problematic.

DE 41 22 295 A1 is directed to an air mass flow meter for the air intake of an internal-combustion engine. DE 41 22 295 A1 describes a device having a tubular housing with a Venturi tube, which is located in a section of the air intake. A first resistor is disposed in the Venturi tube. The temperature and/or resistance of the first resistor is controlled by an electrical circuit, whereby the manipulated variable is the measurement unit for the mass. A second temperature-dependent resistor is provided for compensating the temperature and is longitudinally arranged in the Venturi tube. The first resistor is designed as a bridge in a frame-forming recess of a section of a chip carrier projecting into the Venturi-tube channel. A U-shaped recess is located upstream or downstream in the frame-forming recess over which the second resistor projects as a bridge. In such an arrangement, the heat insulation of the resistor with respect to the retaining device or periphery surrounding it, respectively, is problematic.

Furthermore, resistance thermometers with a substrate consisting of glass or ceramics, in particular in the form of a platelet or a small plate, are known, onto which a thin layer of metal, such as, for example, platinum or nickel, are applied by means of high-vacuum evaporation or cathodic sputtering.

SUMMARY OF THE INVENTION

An object of the present invention is to provide a sensor arrangement for measuring the flowing mass of fluid or gaseous media with high stability and a low response time.

A further object of the present invention is to provide grooves or passages through which a bonding agent such as an adhesive, flows by capillary action, so that a solid, mechanical connection and an insulating seal is achieved in a simple fashion.

A still further object of the present invention is to provide a method for attaching at least one resistor to a carrier.

The above objects and other objects, aims and advantages are provided by the present invention.

The present invention concerns a sensor arrangement for a film type anemometer comprising a carrier plate; a precision heat sensing resistor connected to the carrier plate; a planar, elongated heating resistor supplied with an adjustable power supply, the operational temperature of the heating resistor being increased by a fixed predetermined differential amount versus a temperature determined by the precision resistor, the heating resistor comprising at least one resistive layer disposed on a substrate, the heating resistor being mounted in a bridge-like fashion in a recess of the carrier plate; and a retaining device, having a low heat transfer and having two opposite attachment areas of the carrier plate which retain respective ends of the heating resistor. Each of the attachment areas are directed towards respective ends of the heating resistor and each attachment area has at least a bearing surface, a lateral peripheral surface and a longitudinal peripheral surface which extends in the longitudinal direction of the heating resistor for receiving an end area of the heating resistor. At least one of the surfaces of the attachment areas is fastened in a mechanically stable fashion to an edge area of the heating resistor. The heating resistor is partially covered at least at one of its ends and on a top surface portion thereof in the attachment areas by a surface portion of the carrier plate.

The present invention is further directed to a sensor arrangement for a film type anemometer comprising a carrier plate; a precision heat sensing resistor; a planar, elongated heating resistor supplied with an adjustable power supply, the operational temperature of the heating resistor being increased by a fixed predetermined differential amount versus a temperature determined by the precision heat sensing resistor, the heating resistor comprising at least one resistive layer disposed on a substrate, the heating resistor being mounted in a bridge-like fashion in a recess of the carrier plate; and a retaining device, having a low heat transfer, which includes two opposite attachment areas of the carrier plate which retain respective ends of at least one of the heating resistor and the precision heat sensing resistor. Each of the attachment areas are directed towards respective ends of at least one of the heating resistor and the precision heat sensing resistor, and each attachment area has at least a bearing surface, a lateral peripheral surface and a longitudinal peripheral surface which extends in the longitudinal direction of at least one of the heating resistor and the precision heat sensing resistor, for receiving an end area of the at least one of the heating resistor and the precision heat sensing resistor. At least one of the surfaces of the attachment areas being fastened in a mechanically stable fashion to an edge area of the at least one of the heating resistor and the precision heat sensing resistor. The at least one of the heating resistor and the precision heat sensing resistor is partially covered at least at one of its (their) ends and on a top surface portion thereof in the attachment areas by a surface portion of the carrier plate.

The present invention also concerns a method for attaching and insulating at least one connection area of an elongated heating resistor and/or an elongated temperature sensing precision resistor in attachment areas on a carrier plate of a sensor arrangement for a film type anemometer. The method comprises inserting a heating resistor and/or a temperature sensing precision resistor with their respective ends in a generally U-shaped in cross-section recess at an attachment area as a securing element, and at one end each of the heating resistor and/or the temperature sensing precision resistor contact fields are connected with feed wires at junction points; and applying a bonding agent in the area of the junction points. The bonding agent flows by capillary action along the feed wires which are led in grooves in the carrier plate in the direction of a junction end of the heating resistor and/or the temperature sensing precision resistor, thereby forming not only a seal by the bonding agent, but also a mechanically stable connection. The bonding agent is also applied in the area of contact-free ends of the heating resistor and/or the temperature sensing precision resistor, the bonding agent being fed through a depression in a recess serving as a securing element, the bonding agent, starting from the depression, flowing via grooves to end areas of the heating resistor and/or the temperature sensing precision resistor to thereby form a mechanically stable connection of the heating resistor and/or the temperature sensing precision resistor.

BRIEF DESCRIPTION OF THE DRAWINGS

For the purposes of illustrating the invention there is shown in the drawings forms of the invention which are presently preferred. It is to be understood, however, that the present invention is not limited to the precise arrangements and instrumentalities depicted in the drawings.

FIG. 5b is a cross-sectional view taken along line 5b—5b in FIG. 5a.

FIG. 6b is a cross-sectional view taken along line 6b—6b in FIG. 6a.

FIG. 6c is a partial sectional view taken along line 6c—6c in FIG. 6a.

DETAILED DESCRIPTION OF THE INVENTION

Figure 1A:
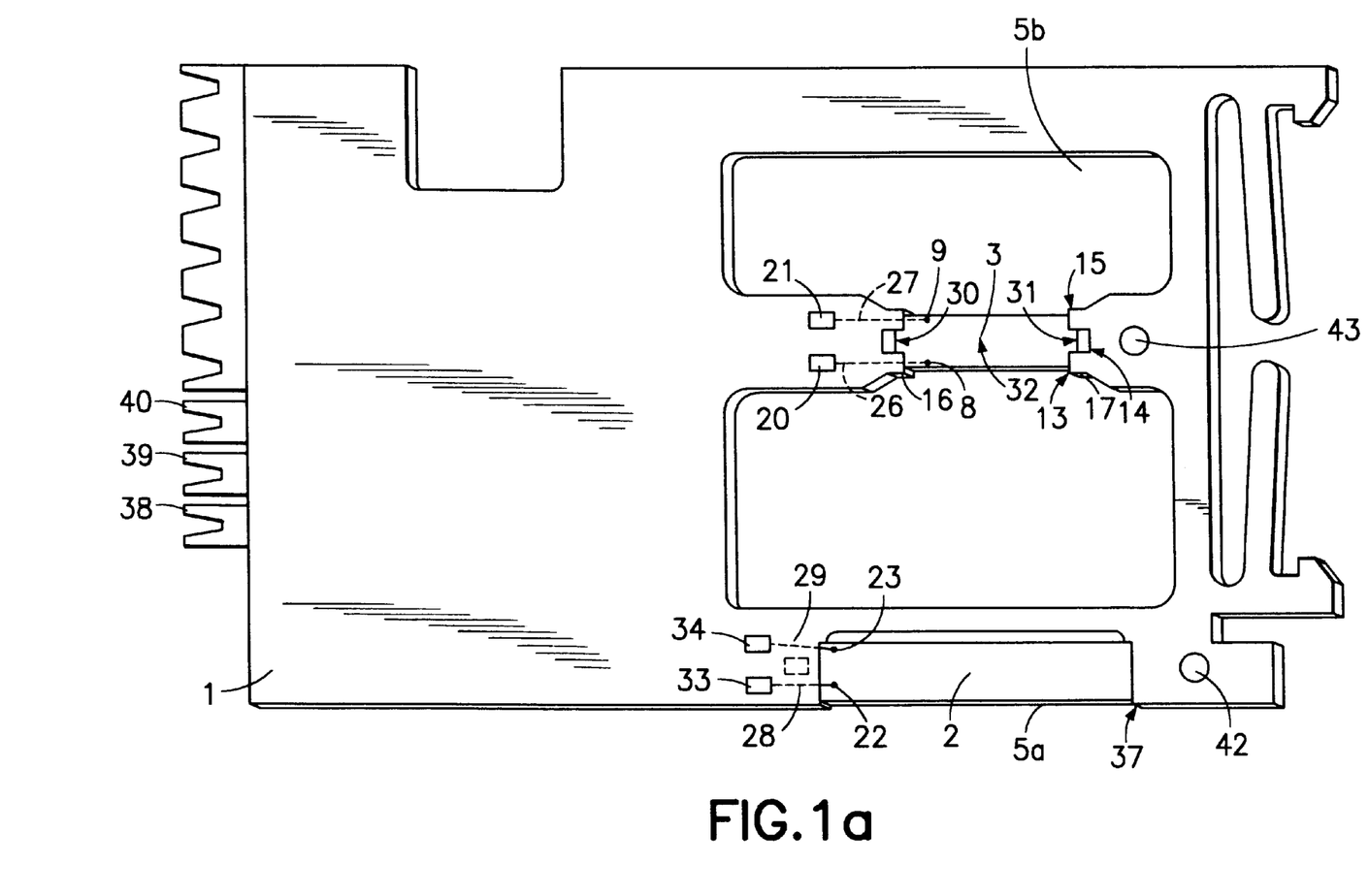
FIG. 1a is a perspective view of a sensor arrangement according to the present invention.

As shown in FIG. 1a, a sensor arrangement of the present invention includes a frame-like carrier plate 1 made of a heatproof synthetic material which is provided with recesses 5a, 5b for receiving a temperature sensing precision resistor 2, and a heating resistor 3, respectively. The flow to be measured passes over the temperature sensing precision resistor 2 and the heating resistor 3, parallel to the main surface of the carrier plate arrangement. The temperature sensing precision resistor 2 comprises a commonly available, platinum temperature thin-layer element.

Figure 1B:
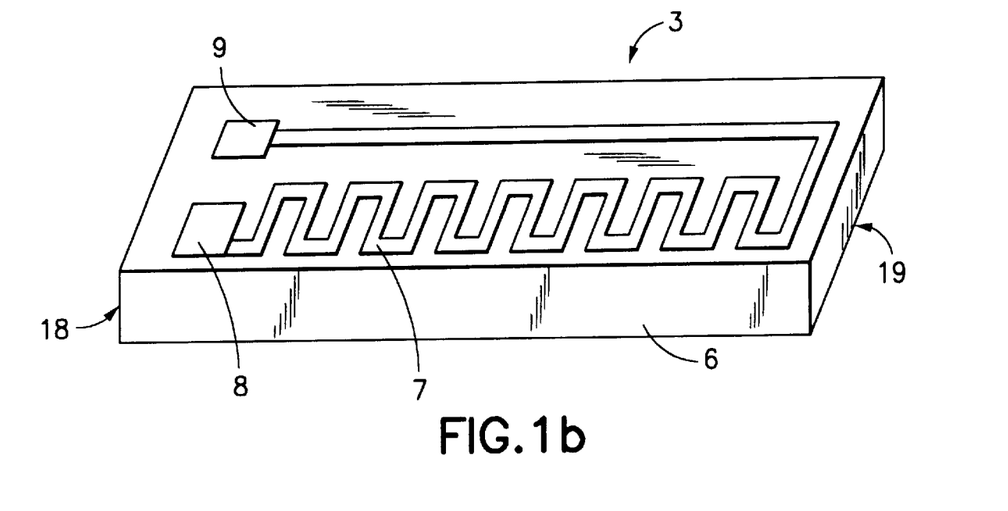
FIG. 1b is a perspective view of a heating resistor applied to a substrate (carrier) in a meandering (wavy or zig-zag) form.

As shown in FIG. 1b, the heating resistor 3 comprises a meandrous (wavy or zig-zag) resistive coating or layer 7 in the form of a heat film or resistive path, respectively, on a ceramic substrate 6 with corresponding protective layers thereon (not shown in FIG. 1a), whereby it has a thickness ranging from 0.1 mm to 0.5 mm to obtain a thermal inertia or a heat capacity which is as low as possible. The length of the heating resistor 3 ranges from 6 to 12 mm and the width ranges from 1.5 to 2.5 mm.

A particularly advantageous material for the ceramic substrate 6 is aluminum oxide since, on one hand, aluminum oxide ensures sufficient protection from the risk of breakage during assembly or operation, and on the other hand, aluminum oxide possesses a relatively low heat capacity, while having a high thermal conductivity, so that changes in the mass flow can be quickly registered. The meandrously applied resistive layer or coating 7 which is disposed on the substrate 6, has connection contacts or contact fields 8, 9, respectively, as can be seen in FIG. 1b.

Figure 1C:
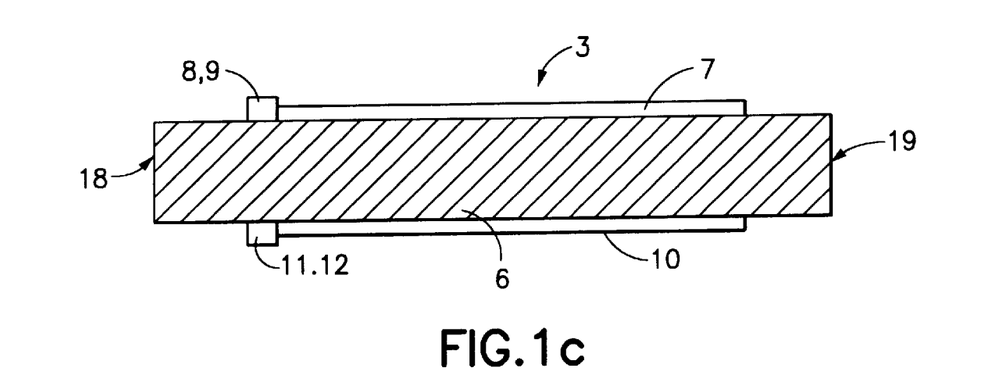
FIG. 1c is a sectional view of a substrate coated on both sides.

In an additional advantageous embodiment the resistive layer or coating 7 is provided on the top and bottom surfaces of the substrate 6, as is shown in FIG. 1c. It can be seen in FIG. 1c that the heating resistor 3 is provided with a resistive layer or coating 7, 10, preferably meandering or wavy as shown in FIG. 1b each on the two opposite surfaces of the ceramic substrate 6, from which a particularly high sensitivity can be attained. The electrical connection of the two opposite resistive coatings 7, 10 takes place through the connection contacts (contact fields) 8, 9, 11, 12. The connection contacts 8, 9, 11 and 12 are connected via internal electrical conductors in the electrically insulating frame of the carrier plate 1 (shown in FIG. 2), comprising a synthetic material, in such a manner that both resistive layers or coatings 7, 10 are connected in series. However, it is also possible to use a parallel connection of resistive, layers or coatings 7, 10 in order to increase, for example, the redundancy and/or freedom from interference.

The actual retaining of the heating resistor 3 in the carrier plate 1 takes place through hollow recesses, which are generally U-shaped in cross-section, as securing or attachment areas 16, 17 of the carrier plate 1. As shown in FIG. 1a and in other figures, the carrier plate 1 comprises a bearing surface 13, two lateral peripheral surfaces 15 and a longitudinal peripheral surface 14, which secure the oppositely lying ends or front sides 18, 19, respectively (see FIGS. 1b and 1c), of the heating resistor 3 at their outer edges or corners, respectively, in a form-locking manner.

To increase the mechanical stability, it is possible to connect each of the outer edges or tips, respectively, of attachment areas 16, 17 with the edge area of the heating resistor 3 by bonding using a bonding agent. The bonding serves to attach and insulate the connection area of the heating resistor 3 and, if required, the connection area of temperature sensing precision resistor 2 as well. For this purpose, the end of the connection area is inserted into the generally U-shaped in cross-section recess of the securing or attachment elements 16, 17 (see FIGS. 3, 4, 5a and 6a), which are shaped as hollow recesses, and at one end each of feed wires 26, 27, 28, 29, (FIG. 2) of the carrier plate 1 are connected with the respective connection contacts 8, 9, 22, 23 of the heating resistor 3 and the temperature sensing precision resistor 2 (FIG. 1a does not show the feed wires for connection contacts 11 and 12). In the area of the junction points 20, 21, 33, 34, a bonding agent is applied which flows through capillary action along the feed wires 26, 27, 28, 29 led in grooves (which are formed in the carrier plate 1) in the direction of the connecting end of the heating resistor 3 and the temperature sensing precision resistor 2, thus forming a seal or electrical insulation, respectively, as well as a mechanically stable connection.

Figure 2:
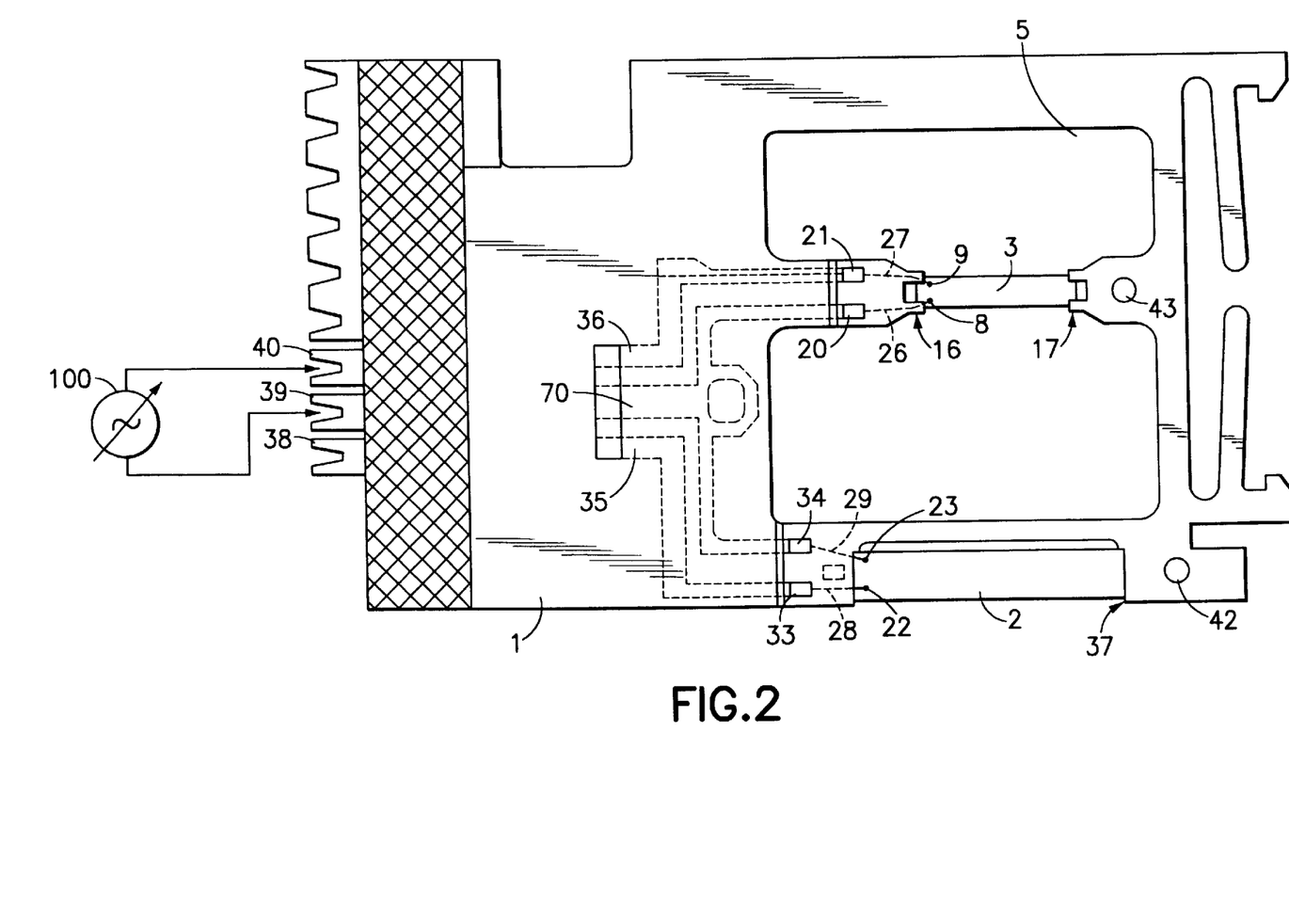
FIG. 2 is a top plan view of the individual components located on the carrier of the sensor arrangement.

As seen in FIG. 2, the area of the contact-free ends of the heating resistor 3 and the temperature sensing precision resistor 2, a bonding agent is fed through a depression 43 in the attachment area 17 and in a depression 42 in recess 37, the bonding agent serving as the securing element. The bonding agent, starting from the depressions 42, 43, flows via grooves or passages forced by a capillary effect in the carrier plate 1 to the contact-free end of the heating resistor 3, and the temperature sensing precision resistor 2, respectively, and forms a mechanically stable connection.

FIG. 2 shows a planar structure of the present invention. The connection contacts 22, 23 and 8, 9, respectively, of the temperature sensing precision resistor 2 and the heating resistor 3, after being retained in carrier plate 1, are connected via the contact fields or areas lying opposite each other by means of feed wires 26, 27, as well as 28, 29 with the junction points 20, 21 or 33, 34, respectively, of the carrier conductor paths 35, 36 and 70. The carrier conductor paths 35, 36 and 70 are, in turn, electrically connected with the outer connection contacts 38, 40, and 39, respectively, of the carrier plate 1.

The carrier plate 1 preferably is made from a synthetic material, such as a plastic, which is heat resistant up to about 260° C. The substrate 6 of the heating resistor 3 preferably comprises aluminum oxide. Due to the retaining device of the heating resistor 3 in the hollow recesses of carrier plate 1, the heat transfer from the heating resistor 3 to the carrier plate 1 is drastically reduced, so that optimal response properties result. The carrier plate 1 can be manufactured employing conventional technology.

An adjustable power supply 100 (see FIG. 2) provides power to the heating resistor 3 via terminals 39 and 40 and conductor paths 70, 36, respectively.

Figure 3:
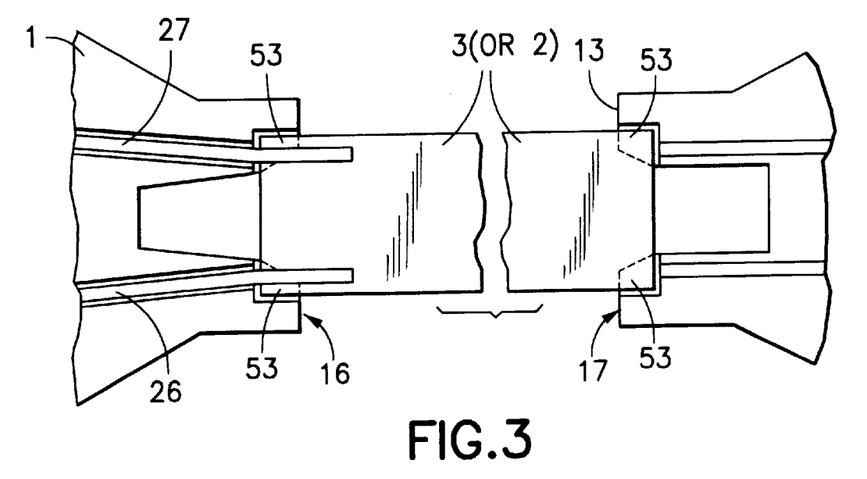
FIG. 3 is an enlarged top plan view showing how the heating resistor is mounted on the carrier or substrate, and showing additional covering surfaces on the heating resistor.

As depicted in FIG. 3, which is an alternative to the embodiment shown in FIG. 1a, it is also possible to cover the corners of the heating resistor 3 with additional covering surfaces 53 in attachment areas 16,17, which are arranged opposite to the bearing surfaces 13. The covering surfaces 53 provide for additional mechanical securing of the heating resistor 3, so that, for example, if the attachment by means of the bonding agent loosens, the functioning of the heating resistor 3 would be ensured through a form-locking retaining device by means of bearing surface 13 and covering surfaces 53.

Figure 4:
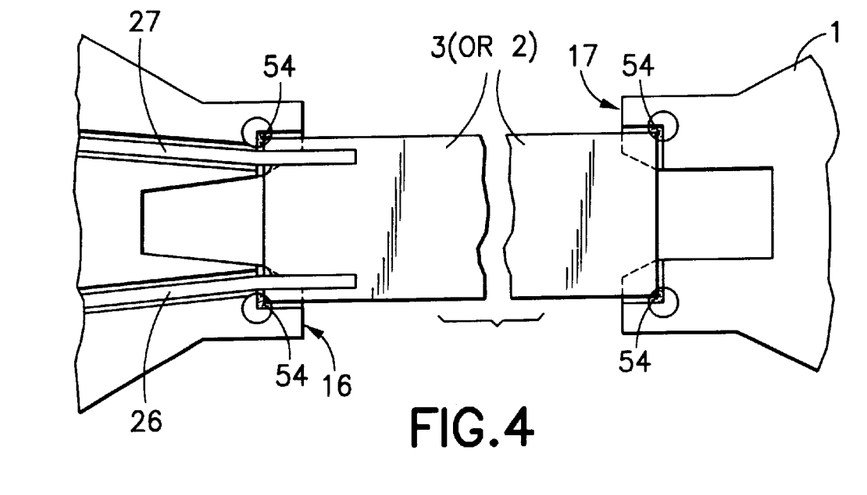
FIG. 4 is an enlarged top plan view showing a form-locking device for retaining the heating resistor, obtained by hot-forming the corresponding carrier plate.

As shown in FIG. 4, it is also possible to obtain a purely form-locking connection between the outermost tips of the generally U-shaped in cross-section attachment elements 16, 17 and the corresponding edge area of the heating resistor 3 through wedging or compressing, respectively, of the synthetic material of the attachment elements, which can be hot-formed. In this manner, it is possible to obtain essentially uniform heating over the entire length of the heating resistor 3, whereby the temperature gradient is extremely low due to the high heat-transmission resistance in the area of the hollow profiles or generally U-shaped in cross-section attachment areas 16, 17, respectively. In this context, the temperature sensing precision resistor 2 can be attached to the carrier plate 1 using a conventional arrangement and electrical contact is made by means of contact fields. However, it is also possible to secure the temperature sensing precision resistor 2 in hollow recesses, as shown in FIGS. 3 and 4, as has been described hereinabove for the heating resistor 3. Both the temperature sensing precision resistor 2 and the heating resistor 3 can be in the form of a meandrous (zig-zag or wavy) resistance path structure, whereby both connection contacts are arranged opposite to each other in the generally U-shaped in cross-section attachment elements 16, 17. The contacts for the heating resistor 3 or the temperature sensing precision resistor 2, respectively, are connected with the switching arrangement of the sensor arrangement through a conventionally constructed conductor path arrangement in the carrier plate 1 by means of the outer connection contacts 38, 39, 40, as was explained hereinabove with reference to FIGS. 1a and 2.

As depicted in FIG. 4, the areas 54 of the form-locking retaining device are located between the bearing surface 13 and the covering surfaces 53.

Figure 5A:
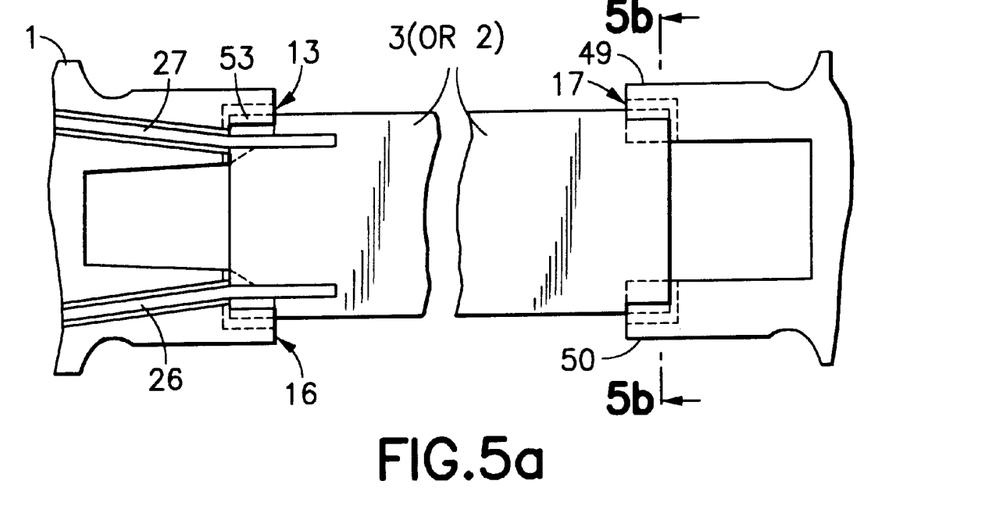
FIG. 5a is an enlarged top plan view showing a heating resistor held by an engagement arrangement.

FIG. 5a shows another retaining arrangement for the heating resistor 3 using one or two-sided securing. The heating resistor 3 is retained at one end in attachment area 16 in a virtually form-locked manner by means of the bearing surface 13, the longitudinal peripheral surface 14 (not shown in FIG. 5a), the lateral peripheral surface 15 (not shown in FIG. 5a), as well as by the covering surface 53. The retaining in attachment area 17 takes place by engaging the edges at the end of the heating resistor 3. The temperature sensing precision resistor 2 can be retained (mounted) in the same manner as the heating resistor 3.

Figure 5B:
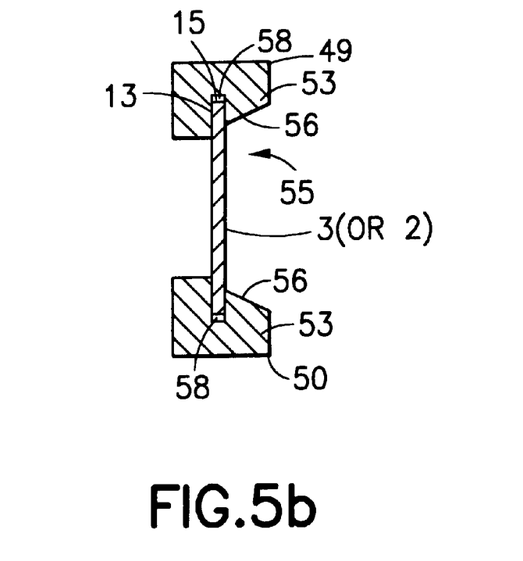

To provide a clearer view, FIG. 5b shows a cross-section along line 5b—5b of FIG. 5a. In FIG. 5b, it can be seen that the heating resistor 3 is introduced along the direction of arrow 55 to attachment area 17 formed by the free legs 49, 50 by compression, and is secured in groove (recess) 58 which is formed by bearing surface 13, lateral peripheral surface 15 and covering surface 53. To prevent longitudinal displacement, a longitudinal peripheral surface 14 (not shown in FIGS. 5a and 5b) is provided (see FIG. 1a). Inclined surfaces 56 are provided on shortened covering portions (additional coupling surfaces) 53, over which the edges of the temperature sensing precision resistor 2 or the heating resistor 3 are pressed until they "snap" into the grooves (recesses) 58, due to the resiliency of the materials used. The guiding or lead-in surfaces 56 may be flatly inclined or may be curved.

Figure 6A:
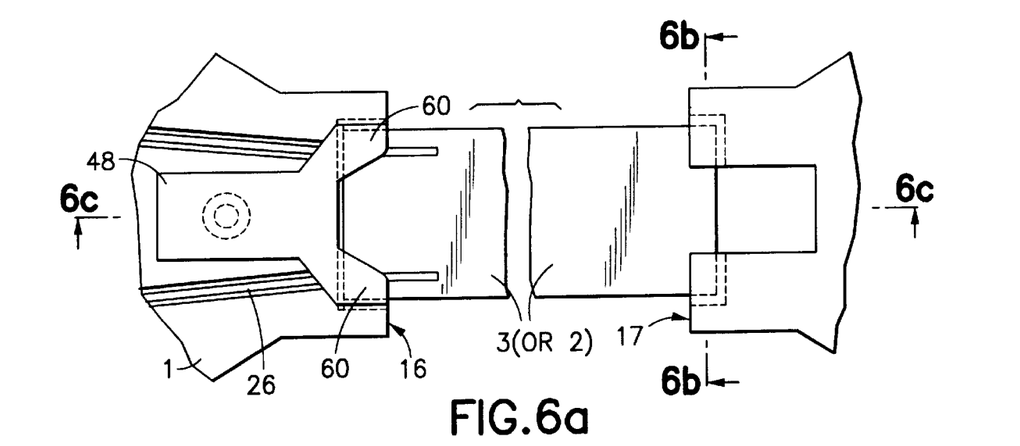
FIG. 6a is an enlarged top plan view showing a clamping device for retaining the heating resistor on the carrier plate.
Figure 6B:
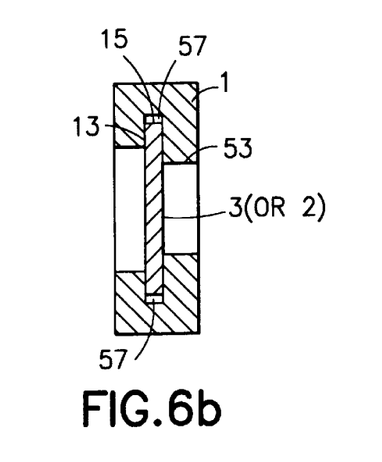
Figure 6C:
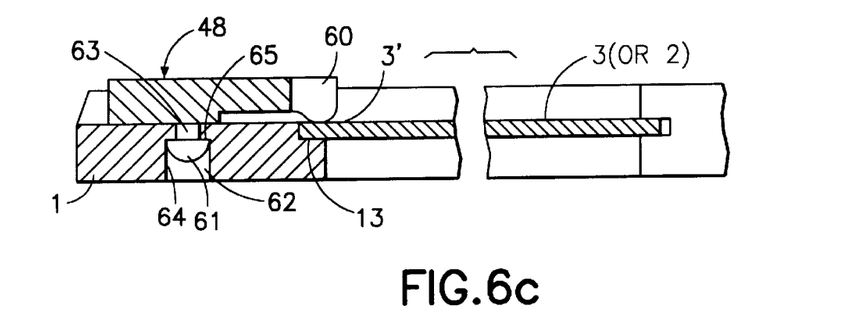

As shown in FIGS. 6a to 6c, the heating resistor 3 may be retained in place by a clamping device 48 which is attached to the carrier plate 1. The embodiment depicted in FIG. 6a is similar to that depicted in FIG. 5a, wherein one end of the heating resistor 3 is introduced in a virtually form-locked retaining device of attachment area 17 and the other end is arranged in attachment area 16 in a recess 57 of carrier plate 1 defined by a lateral peripheral surface 15, a longitudinal peripheral surface 14 and a bearing surface 13. The clamping device 48 includes a spring-like tongue member 60 (shown in FIGS. 6a and 6c), which is connected by means of a fastening bolt or projection 61 (shown in FIG. 6c), to carrier plate 1. The clamping (locking) device 48 is adjusted such that the spring-like tongue 60 exerts pressure (in a leaf spring-like manner) onto the surface of the heating resistor 3 in the attachment area 16 (see FIG. 6c), so that the heating resistor 3 is tightly secured in the attachment area 16 by a virtually force-locking retaining device.

As seen in FIG. 6c, the fastening bolt or projection 61 has a generally "mushroom" shaped head portion 66 and is snap (press) fitted into a stepped hole 62 in the carrier 1. The stepped hole 62 has a smaller diameter portion 63 and a larger diameter portion 64 with a step 65 therebetween. The mushroom shaped head portion 66 of the fastening bolt or projection 61 is pressed from above (as seen in FIG. 6c) into the smaller diameter hole portion 63 and is slightly compressed. As the mushroom shaped head portion 66 is pressed downward, it snaps over step 65 and is retained in the larger diameter hole portion 64 by means of engagement with the step 65 (see FIG. 6c). The clamping (locking) device 48, with its fastening bolt or projection 61 and the spring-like tongue member 60, are preferably made of a resilient plastic material to provide "springiness" to the spring-like tongue member 60 and compressibility to the mushroom shaped head portion 66. The heat sensing resistor 2 may be retained (mounted) in a similar manner as the heating resistor 3.

FIG. 6b shows a sectional view taken along line 6b—6b in FIG. 6a, wherein the form-locking retaining device in the attachment area 17 can be seen. FIG. 6c shows a longitudinal sectional view taken along line 6c—6c in FIG. 6a, wherein the clamping device 48 with its spring-like tongue member 60 can be seen, which presses the end surface 3' of heating resistor 3 against the bearing surface 13. The clamping (locking) device 48 is connected in a mechanically stable fashion with the carrier plate 1 by means of the above described fastening bolt or projection 61.

It will be appreciated that the instant specification is set forth by way of illustration and not limitation, and that various modifications and changes may be made without departing from the spirit and scope of the present invention.

What is claimed is:

1. A method for attaching and insulating at least one connection area of one or both of an elongated heating resistor having two ends and an elongated temperature sensing resistor having two ends on a carrier plate of a sensor arrangement for a film type anemometer, comprising:

(a) inserting one or both of (i) the ends of the elongated heating resistor and (ii) the ends of the elongated temperature sensing resistor in a respective recess on said carrier plate as a securing element, said recess having a substantially U-shaped cross-section, and electrically connecting at least one or both of (i) the elongated heating resistor and (ii) the elongated temperature sensing resistor at contact fields with feed wires at junction points;

(b) applying a bonding agent in an area of the junction points, such that the bonding agent flows by capillary action along the feed wires which are led in grooves in said carrier plate in the direction of a junction end of one or both of (i) the elongated heating resistor and (ii) the elongated temperature sensing resistor, thereby forming a seal by said bonding agent and forming a mechanically stable connection; and (c) applying said bonding agent in an area of contact-free ends of one or both of (i) the elongated heating resistor and (ii) the elongated temperature sensing resistor, the bonding agent being fed through a depression in the recess serving as a securing element, said bonding agent, starting from the depression, flowing via grooves in the carrier plate to the area of the contact-free ends of (i) the elongated heating resistor and (ii) the elongated temperature sensing resistor, to thereby form a mechanically stable connection of one or both of (i) the elongated heating resistor and (ii) the elongated temperature sensing resistor.

2. The method according to claim 1, wherein said heating resistor comprises a resistive layer in a form of a film.

3. The method according to claim 1, wherein said heating resistor has a substrate which comprises aluminum oxide having a thickness of about 0.1 to about 0.3 mm.

4. The method according to claim 3, wherein said heating resistor comprises a resistive layer in a form of a film on at least one surface of said substrate.

5. The method according to claim 4, wherein said resistive layer of said heating resistor includes a zig-zag shaped resistive layer on at least one surface of said substrate.

6. The method according to claim 4, wherein said heating resistor includes said resistive layer on each of opposite surfaces of said substrate.

7. The method according to claim 1, wherein said heating resistor comprises a substrate and a resistive layer disposed on at least one surface of said substrate.

8. The method according to claim 7, wherein said resistive layer of said heating resistor includes a zig-zag shaped resistive layer on at least one surface of said substrate.

9. The method according to claim 7, wherein said heating resistor includes said resistive layer on each of opposite surfaces of said substrate.

* * * * *